United States Patent [19]

Ushiyama

[11] Patent Number: 5,617,532

[45] Date of Patent: Apr. 1, 1997

[54] INFORMATION PROCESSING APPARATUS AND DATA BACK-UP/RESTORE SYSTEM FOR THE INFORMATION PROCESSING APPARATUS

[75] Inventor: Yuichi Ushiyama, Shiojiri, Japan

[73] Assignee: Seiko Epson Corporation, Tokyo, Japan

[21] Appl. No.: 466,023

[22] Filed: Jun. 6, 1995

Related U.S. Application Data

[63] Continuation-in-part of Ser. No. 242,142, May 13, 1994, abandoned, which is a continuation of Ser. No. 779,027, Oct. 18, 1991, abandoned.

[30] Foreign Application Priority Data

| Oct. 18, 1990 | [JP] | Japan | 2-279804 |
| Nov. 30, 1990 | [JP] | Japan | 2-335730 |

[51] Int. Cl.$^6$ ................................. G06F 11/00
[52] U.S. Cl. ................. 395/183.12; 395/185.05; 395/182.04; 395/182.13
[58] Field of Search .............. 395/183.12, 182.13, 395/182.12, 182.22, 750, 182.05, 182.04, 489

[56] References Cited

U.S. PATENT DOCUMENTS

| 4,521,847 | 6/1985 | Ziehm et al. | 364/184 |
| 4,849,978 | 7/1989 | Dishon et al. | 371/51 |
| 4,907,150 | 3/1990 | Arroyo et al. | 371/14 |
| 5,056,092 | 10/1991 | Bruner | 371/14 |
| 5,077,686 | 12/1991 | Rubinstein | 395/550 |
| 5,089,958 | 2/1992 | Horton et al. | 395/575 |
| 5,109,505 | 4/1992 | Kihara | 395/575 |
| 5,355,490 | 10/1994 | Kou | 395/700 |
| 5,396,635 | 3/1995 | Fung | 395/800 |
| 5,465,367 | 11/1995 | Reddy et al. | 395/750 |

OTHER PUBLICATIONS

Kate O'Day "Discovering MS DOS" 1985 The Work Grouping pp. 37–39.

Woodroch, "The Concise Guide to Microsoft MS–DOS Operating System" 1991 Microsoft press pp. 23–24.

White "How Computers Work" 1993 PC Computing Publishing pp. 5–11.

Primary Examiner—Robert W. Beausoliel, Jr.
Assistant Examiner—Joseph E. Palys
Attorney, Agent, or Firm—Loeb & Loeb LLP

[57] ABSTRACT

An information processing apparatus backs up status of a CPU 1- and content of a main memory 30 into a back-up memory 50 at the time of power-off, restores the data backed up in the back-up memory at the time of power-on to resume data processing, and informs the start of the resumed data processing or the termination of the data processing by a buzzer.

19 Claims, 14 Drawing Sheets

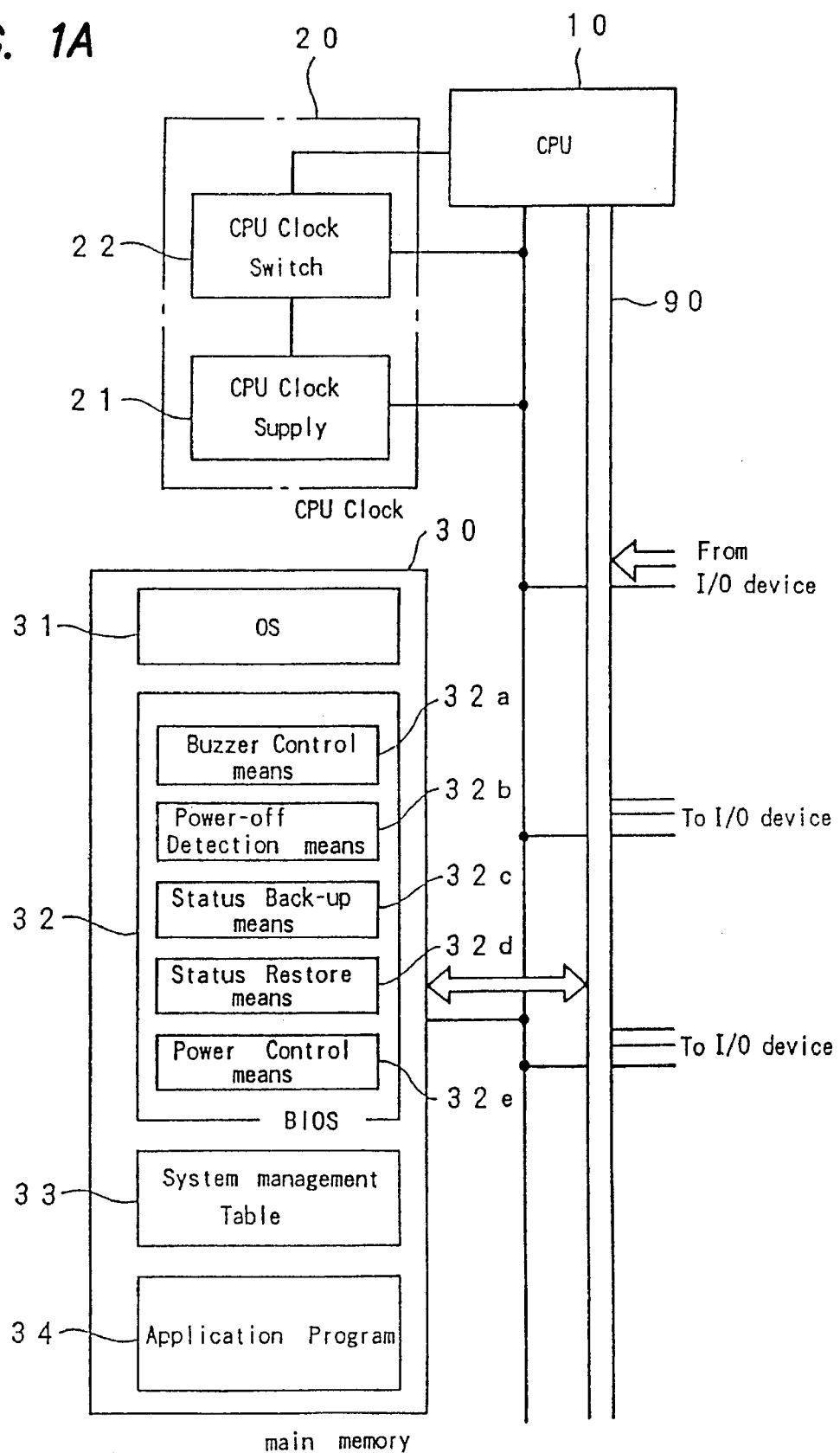

I/O devices

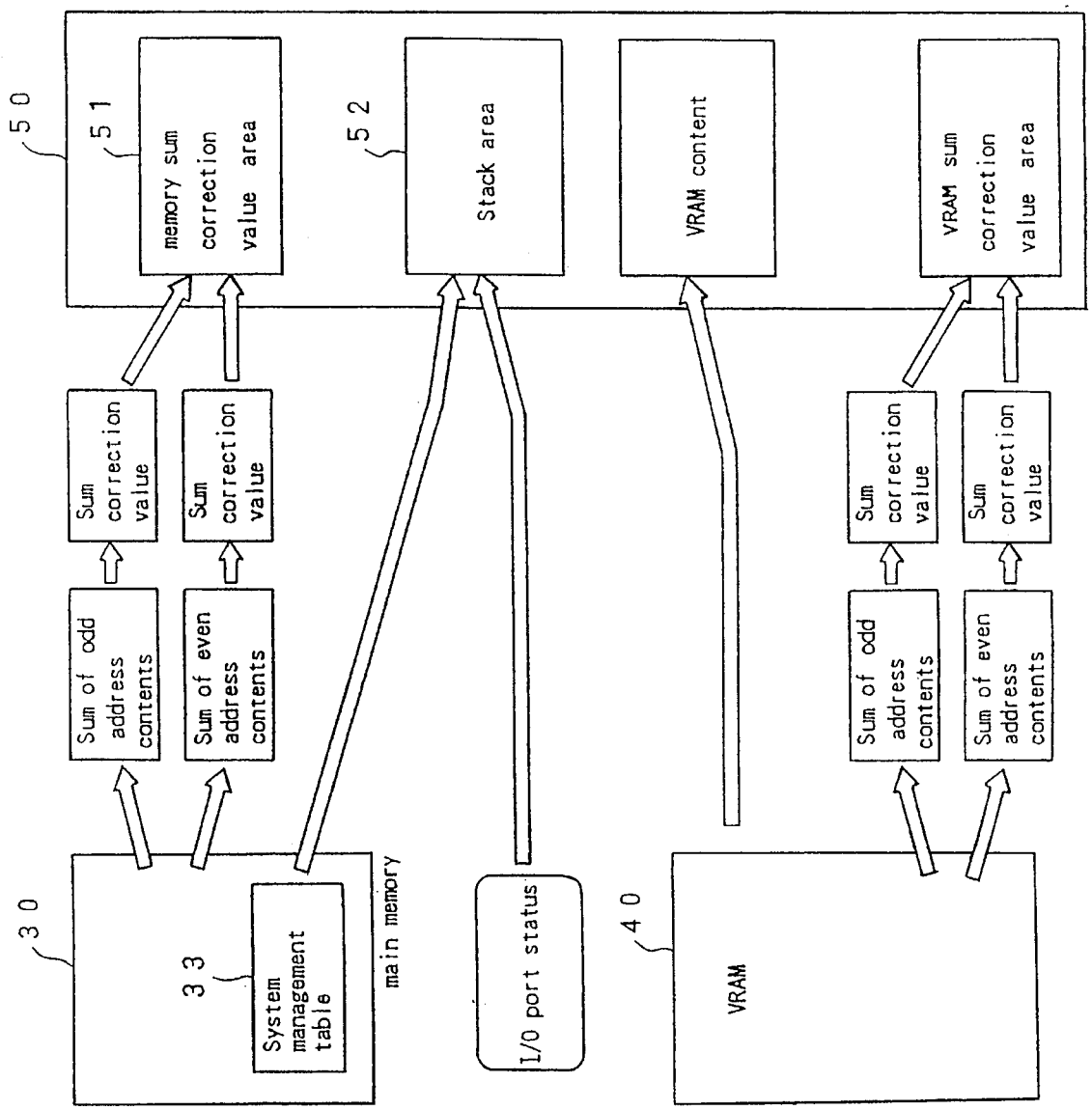

INFORMATION PROCESSING APPARATUS AND DATA BACK-UP/RESTORE SYSTEM FOR THE INFORMATION PROCESSING APPARATUS

CROSS-REFERENCE TO RELATED APPLICATIONS

This application is a continuation-in-part of application Ser. No. 08/242,142 filed May 13, 1994, now abandoned, which is a continuation of application Ser. No. 07/779,027 filed Oct. 18, 1991 and now abandoned.

BACKGROUND OF THE INVENTION 1. (Field of the Invention)

The present invention relates to an information processing apparatus, such as a personal computer or a personal word processor, having a processor control unit.

2. (Related Background Art)

Current versions of portable or transportable information processing apparatus, such as personal computers and personal word processors, have an internal data preserve function which preserves a status at the time of power-off and restores the preserved status when the power is next turned on to continue data processing. In this function, the status at the time of the power-off including the displayed content is stored in a memory when the operation status of the information processing apparatus is displayed on a display screen, and when the power is turned on again the information processing apparatus can resume with the same status as that at the time of the power-off. When such a mechanism is operated, an operator notices the power-off condition because the brightness of the display or a back light is darkened when a power switch is turned off during the operation of the information processing apparatus. However, in reality, data is being moved to the memory in the information processing apparatus to back up the data. When all processing is completed after a predetermined time period, a portion or all of the power supply circuit is turned off.

When the power switch is later switched from the turn-off state to the power-on state, the operator notices the state change because the display is brightened. However, in the processing unit, the backed-up data are being moved to the memory of the processing apparatus or the display and the processing apparatus will not work initially even if the operator depresses a key of a keyboard. That is, the completion of restoration of the preserved status is delayed from the moment of switching to the power-on state when such a function is installed, and there is no means to clearly determine when the restoration of the preserved status has been completed.

Further, the movement of the back-up data to the processing apparatus when the power is turned on may not be normally performed. In such a case, the processing apparatus does not work even if a key of the keyboard is depressed or, even if it works, the execution gradually becomes out of order.

SUMMARY OF THE INVENTION

It is an object of the present invention to improve the status restoration operation of such information processing apparatus when it is switched to the power-on state.

Objects according to the invention are achieved by the provision of a method of backing-up/restoring data in an information processing apparatus having a first memory for storing first data, a second memory for storing second data, a back-up memory for backing up a status of the first data and a status of the second data, and control means for controlling the first memory, the second memory and the back-up memory through a bus line, the method comprising the steps of:

(a) making a power-off status configuration data in the second data in accordance with a predetermined logical operation at the time of power-off, the power-off status configuration data differing from the second data;

(b) backing up the power-off status configuration data and the first data at the time of power-off in the back-up memory;

(b-1) changing a refresh signal of the back-up memory to a frequency for keeping a data of the back-up memory;

(c) making a power-on status configuration data in the second data in accordance with the predetermined logical operation at the time of power-on; and (d) comparing the power-off status configuration data with the power-on status configuration data to directly determine whether the second data has changed by the maximum of clock signal frequency of the apparatus, (e) reporting an operational status message to an operator of the apparatus indicating the completion of the restoration of the data when the second data is changed in view of the comparison resulting from step (d), and the apparatus becomes operable after the completion of step (c), and (f) changing a frequency of the clock signal to frequency of an operational condition.

Objects according to the invention are further achieved by the provision of a data back-up/restore system of an information processing apparatus comprising memory means connected to control means through a bus line; status back-up means for backing up the status of the control means and the content of the memory means at the time of power-off; and status restore means for restoring the status backed up by the status back-up means at the time of power-on to resume the data processing; wherein the system carries out the steps of: backing up a first environmental status configuration at the time of power-off into the status back-up means; comparing the first environmental status configuration at the time of power-off backed up by the status back-up means with a second environmental status configuration when the power is turned on; and permitting the use the apparatus by a user when the first environmental status configuration is identical to the second environmental status configuration. The first environmental status configuration may include information derived by an error detection process performed on data preserved in the memory, connection status information of external memories, or I/O port information.

The present invention will become more fully understood from the detailed description given hereinbelow and the accompanying drawings which are given by way of illustration only, and thus are not to be considered as limiting the present invention.

The further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

BRIEF DESCRIPTION OF THE DRAWING

FIGS. 1A, 1B and 1C show a configuration of one embodiment of the present invention.

FIG. 6 shows a conceptual view of the back-up to a back-up memory.

DESCRIPTION OF THE PREFERRED EMBODIMENTS

One embodiment of the present invention will be explained with reference to FIGS. 1 to 6.

Figure 1B:
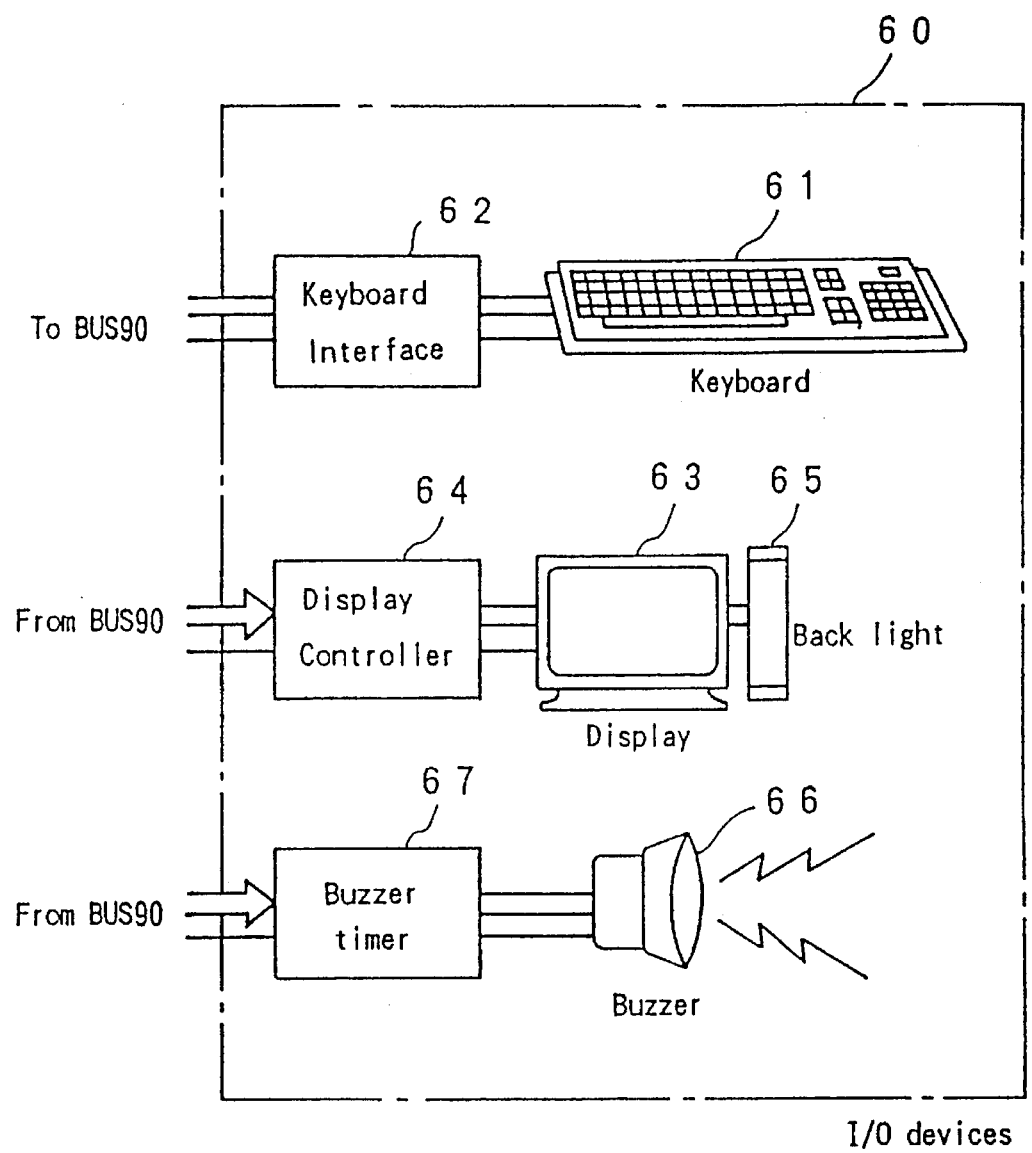
Figure 1C:
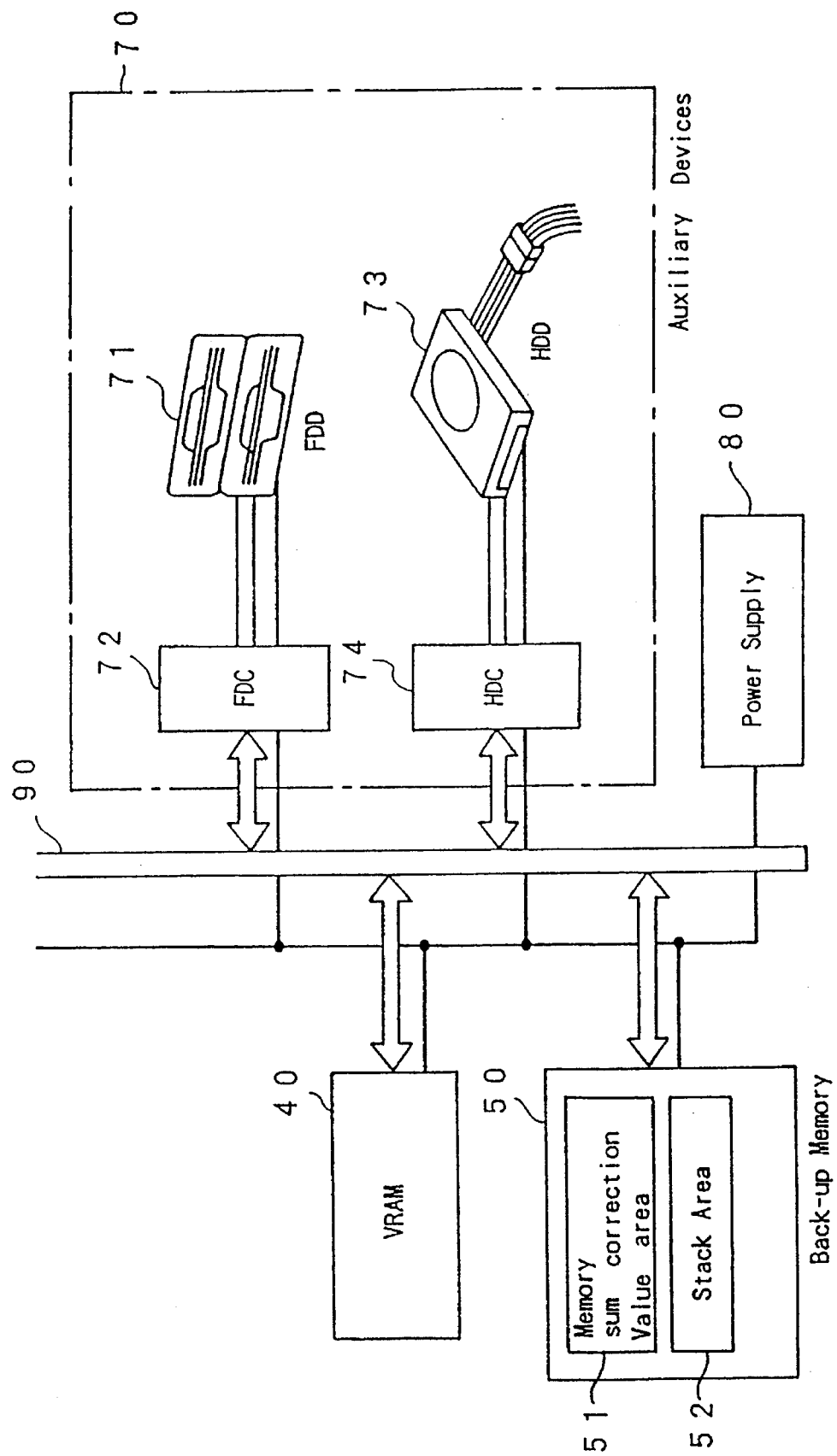
Figure 1D:
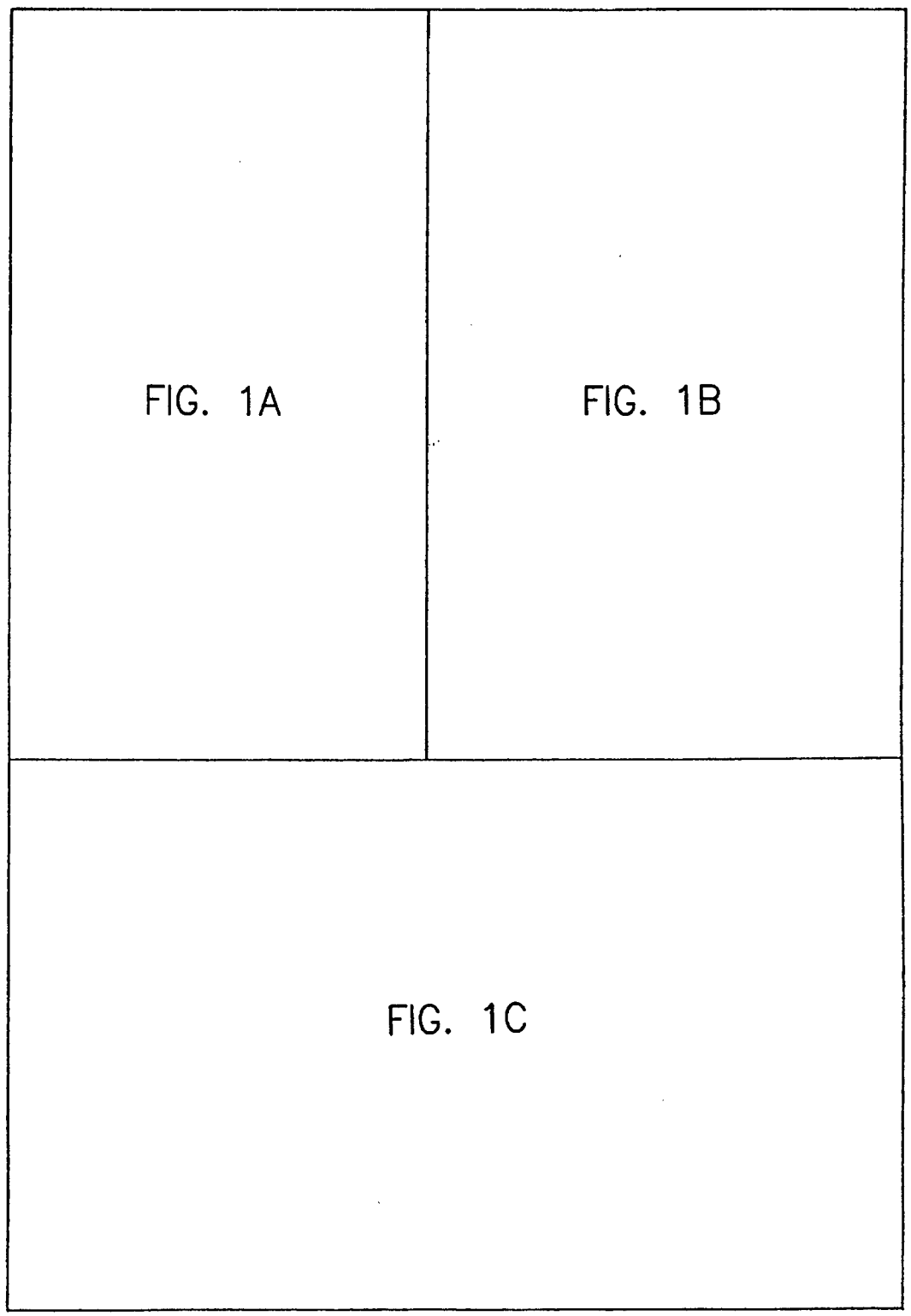
FIG. 1D shows the constructive relationship between FIGS. 1A, 1B and 1C.

FIGS. 1A, 1B and 1C show a configuration of an information processing apparatus of the present invention. The information processing apparatus comprises a CPU 10 which is control means, a CPU clock 20 for clocking the CPU 10, a main memory 30 for storing programs and data, a VRAM 40 for storing image data and permitting high speed access, a back-up memory 50 which preserves data when system power is turned off, an input/output device 60 for controlling input/output, an auxiliary memory 70 for storing data and a power supply 80 for supplying power to the respective units from a power mains or a battery.

The CPU clock 20 includes a CPU clock supply 21 for generating a reference clock signal and a CPU clock-switch 22 for switching from the reference clock signal to a desired clock signal.

The main memory 30 includes an OS (operating system) 31, a BIOS (basic input/output system) 32, a system management table 33 which manages connection status information of the auxiliary memory 70 and application programs 34. The BIOS 32 includes buzzer control means 32a, power-off detection means 32b, status back-up means 32c, status restore means 32d and power control means 32e.

The back-up memory 50 includes a memory sum correction value area 51 and a stack area 52.

The input/output device 60 includes a keyboard 61, a keyboard interface 62, a display 63, a display controller 64, a back light 65 for illuminating the display 63, a buzzer 66 controlled by the buzzer control means 32a and a buzzer timer 67. The buzzer timer 67 is used to determine a frequency of the buzzer sound of the buzzer 66.

The auxiliary memory 70 includes a floppy disk drive 71, a FDC (floppy disk controller) 72, a hard disk drive 73 and a HDC (hard disk controller) 74. In the present embodiment, the CPU 10 gives instructions to the respective units through the bus line 90 along with processing by the BIOS 32 to attain a standby state, or resume function. At that time, a low level of power is supplied to the main memory 30 and the back-up memory 50 after power-off of the system power so that the data stored in those memories are preserved even after the power-off of the system power. Accordingly, the data which should be backed up at power-off in order to attain the standby condition in the back up memory 50 includes the image data, and the data stored in the main memory is not backed up. The system environmental status configuration which is a feature of the present embodiment is also backed up to the back-up memory 60 at this stage.

Figure 2:
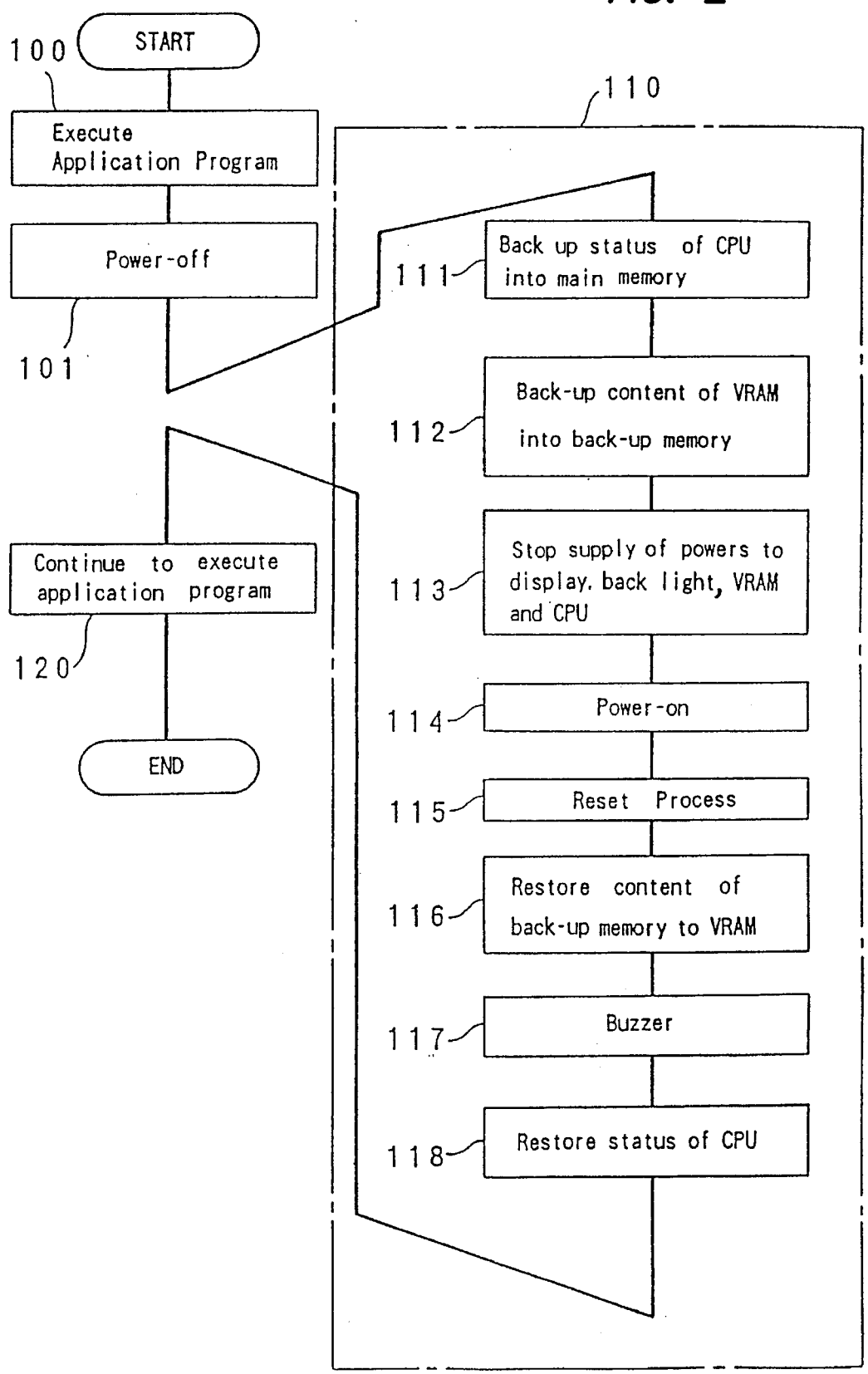
FIG. 2 shows a flow chart of an operation of the embodiment of FIGS. 1A–1C.

Referring to the flow chart of FIG. 2, operation from power-off to power-on and the information for the resumption of the data processing through the inform means is explained. When the power switch is turned off (step 101) during the execution of an application program 34 (step 100), a power-off detection interruption signal is generated and the control is shifted to a power-off process 110. In process 110, the status of the CPU 10 is backed up into the main memory 30 (step 111) and the content of the VRAM 40 is backed up into the back-up memory 50 (step 112). The content of the VRAM 40 is backed up into the back-up memory 50 in order to permit termination of the supply of power to the VRAM 40 which is a high power consuming dual port memory. Then, the supply of power to the display 63, the back light 65, the VRAM 40 and the CPU 10 is stopped (step 113). Since the supply of power to the CPU 10 is stopped, the CPU 10 stops. The content backed up in the back-up memory 50 in the step 112 is preserved by the supply of power from the power supply 80.

When the power is subsequently turned on (step 114), the CPU 10 starts the processing from the reset status (step 115) and the content backed up in the back-up memory 50 in the step 112 is restored (step 116). In order to indicate to a user that the restoration to the VRAM 40 has been completed, the buzzer generates a short sound (step 117). The short sound may, if desired, be repeated one or more times or can be replaced by a long sound. The indication may be alternatively or additionally be provided by displaying a message on the display 63 or flashing an LED lamp (not shown). The combination with the buzzer 66 enhances the effect. The status of the CPU 10 is restored so that the application program 34 is executed from the next program instruction after the power-off detection interruption 110 (step 118). In this manner, the execution of the application program 34 is continued (step 120).

In the present embodiment, the indicator means is active when the time of instruction to the processing apparatus and the time of operation of the processing apparatus are not simultaneous. Namely, at the time of completion of the data processing when the power is turned off or at the time of start of the data processing when the power is turned on, the buzzer sound is generated, the lamp is flashed, the display is flashed or a message is displayed. By indicating the status of the processing apparatus to the user, the user can exactly determine the timing to continue the operation. The effect of such indicator means is of considerable value at various places when such means is installed in small-sized portable information processing apparatus.

The data back-up/restore system of the present embodiment is explained with reference to a flow chart of FIGS. 3A, 3B, 3C and 3D. In the present system, it is assumed that the standby state, or resume function, can be selected by a dip switch or a software switch. The resume function is enabled or disabled by the software switch (step 200). If the resume function is enabled, an interruption request is issued when the power is turned off. When the power is turned off (step 202) during the execution of the application program 34 (step 201), whether the resume function has been enabled in the step 200 or not is determined (step 203). If the resume function has been enabled, the power-off detection interruption request (process 300) is issued and the control is shifted to the power-off process. If the resume function has been disabled in the step 200, the system is stopped. When the power-off detection interruption request is issued, the status of the CPU 10, the status of the CPU clock, i.e. the present clock frequency, the value of the check sum which is the system environmental status configuration, the connection status of the auxiliary memory 70 and the status information of the I/O ports are backed up in the back-up memory 50 (step 310). The CPU 10 then instructs to the CPU clock switch 22 to switch the clock of the CPU 10 to a maximum clock rate, 16 MHz (step 320). Then, the content of the VRAM 40 is backed up in the back-up memory (step 330). After the back-up, the supply of power to the display 63, the back light 65, the VRAM 40 and the CPU 10 is stopped (step 340). The user ceases use the personal computer under this condition.

Thereafter, when the user turns on the power to resume use of the personal computer (step 350), the reset sequence is executed as a system initialization process (step 360). The reset sequence is primarily executed for the VRAM 40 and not for the main memory 30 in which the data is preserved after the turn-off of the system power. The content of the VRAM 40 which was backed up in the back-up memory 50 in the step 330 is restored to the VRAM 40 (step 370). The value of the check sum, the connection status of the auxiliary memory 70 and the status information of the I/O port which were backed up in the back-up memory in the step 310 are read and they are compared with the current status (step 380). If they are not equal in the comparison, a message is displayed on the display 63 (step 390) and the system is stopped. The message may be "Cannot resume. Depress reset key". The user is permitted to use the system without the resume function by depressing the reset key. If they are equal in the step 380, the buzzer is activated to inform the user that the user can use the personal computer (step 400). Substantially simultaneously with the buzzer alarm, the CPU clock speed and the status of the CPU 10 are restored from the back-up memory 50 (steps 410 and 420). The power-off detection interruption sequence 300 is thus completed and the application program 34 is executed in a continuous manner (step 210).

Figure 3A:
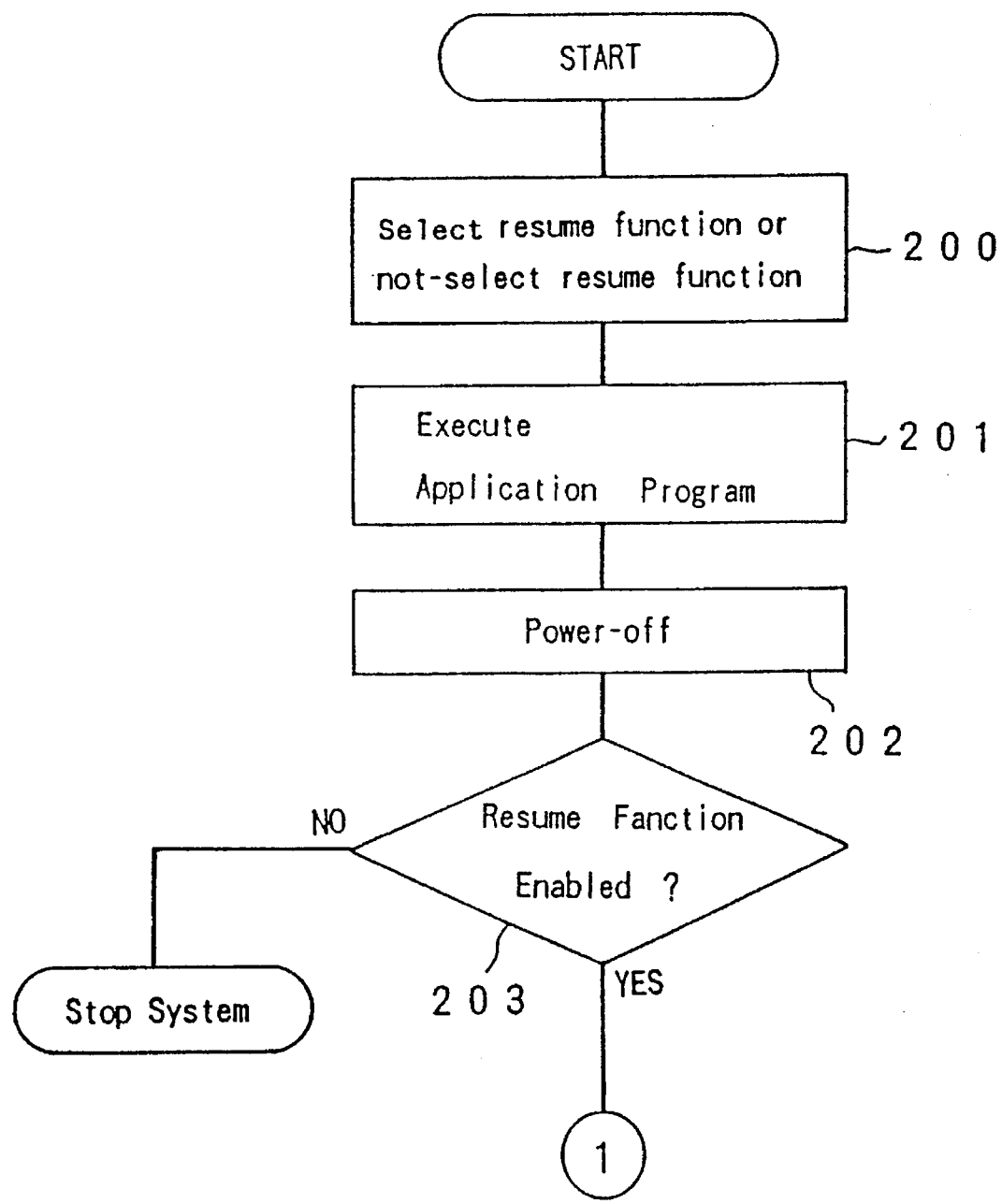
FIGS. 3A, 3B, 3C and 3D show flow charts of a data back-up/restore operation of the embodiment of FIGS. 1A–1C.
Figure 3B:
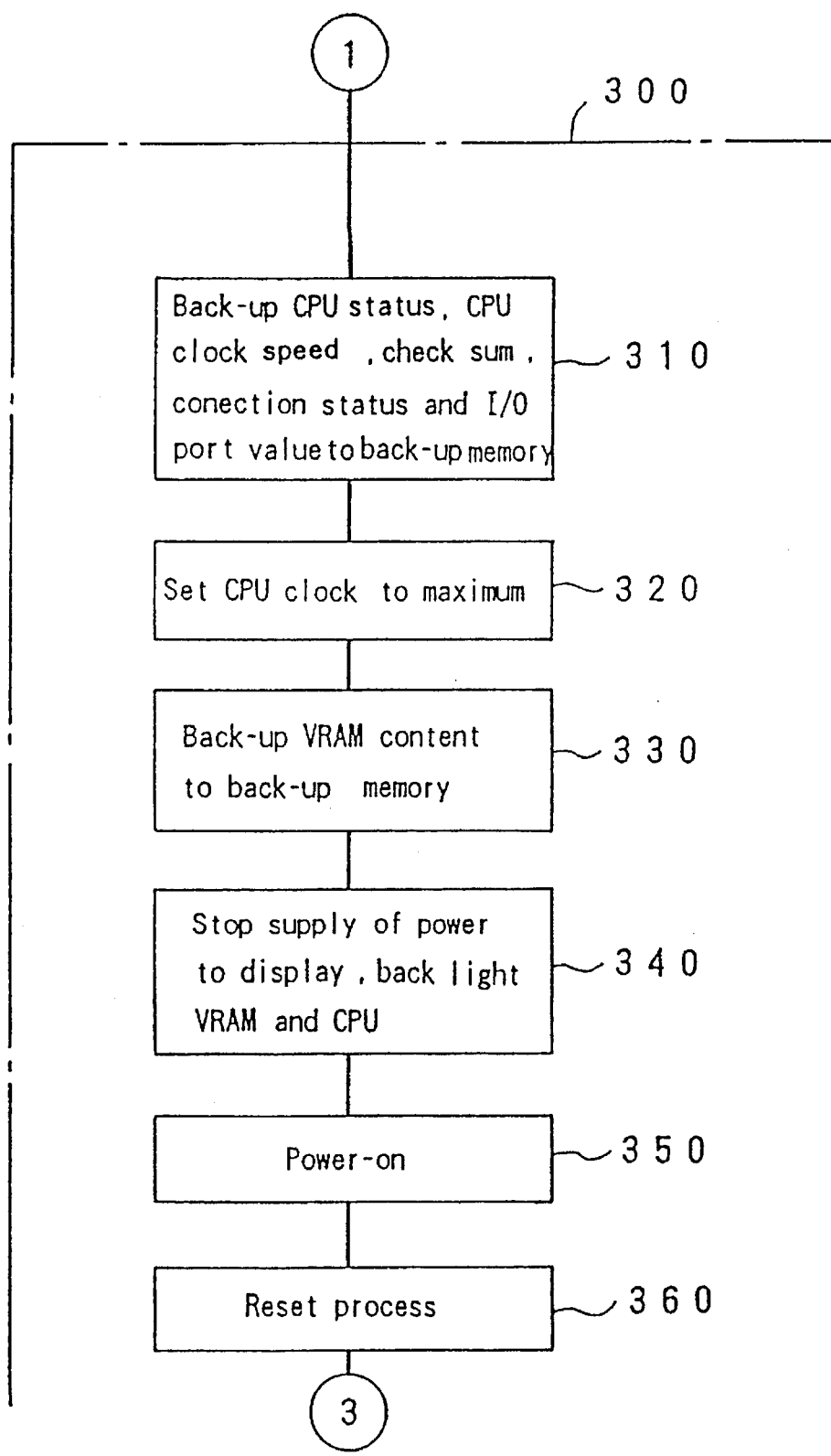
Figure 3C:
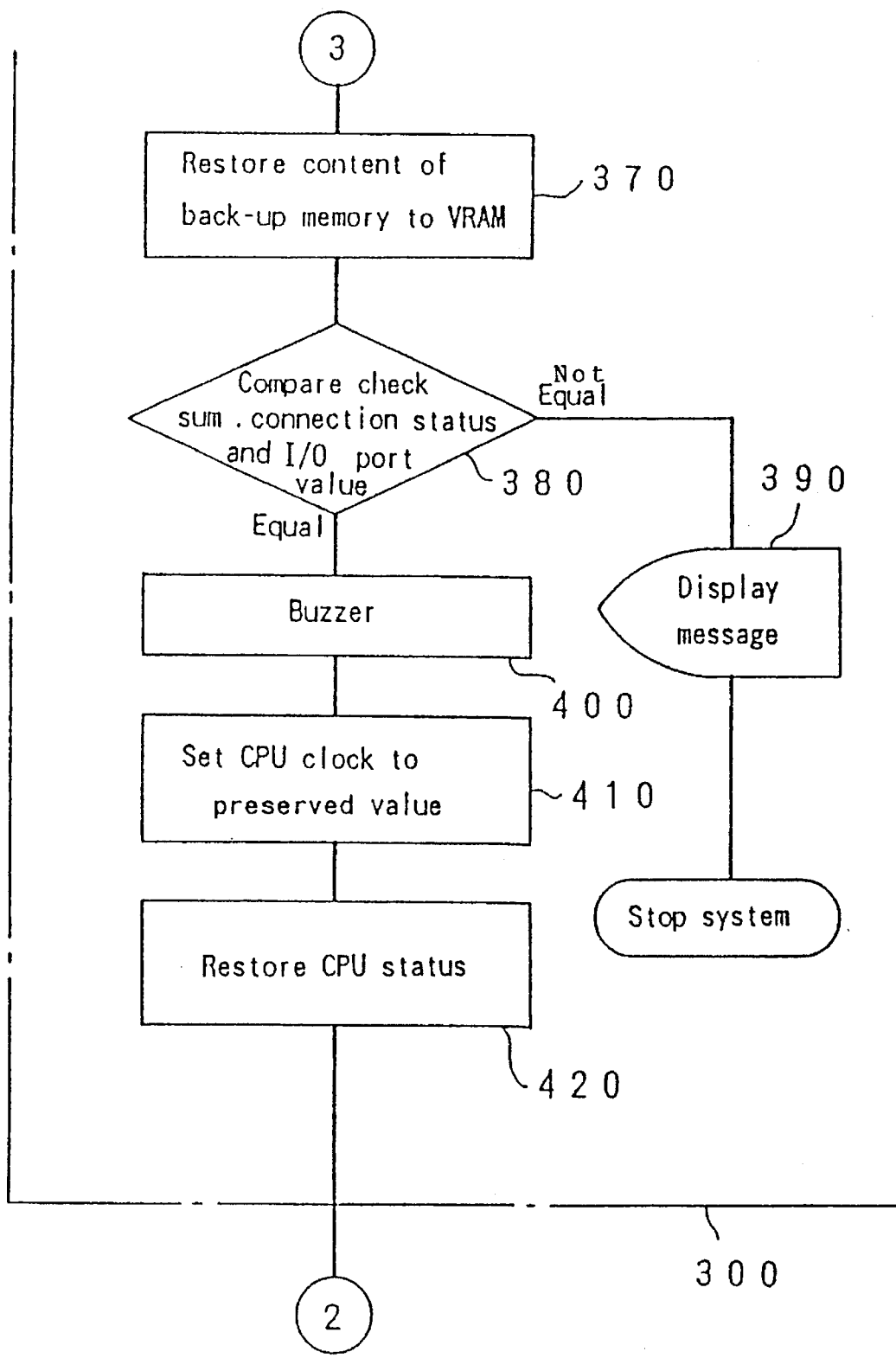
Figure 3D:
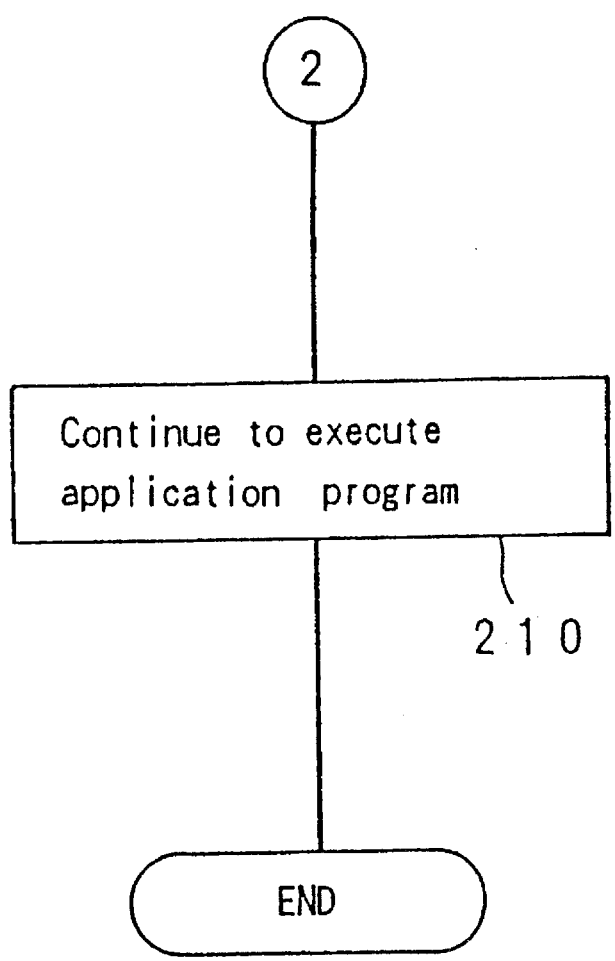
Figure 4A:
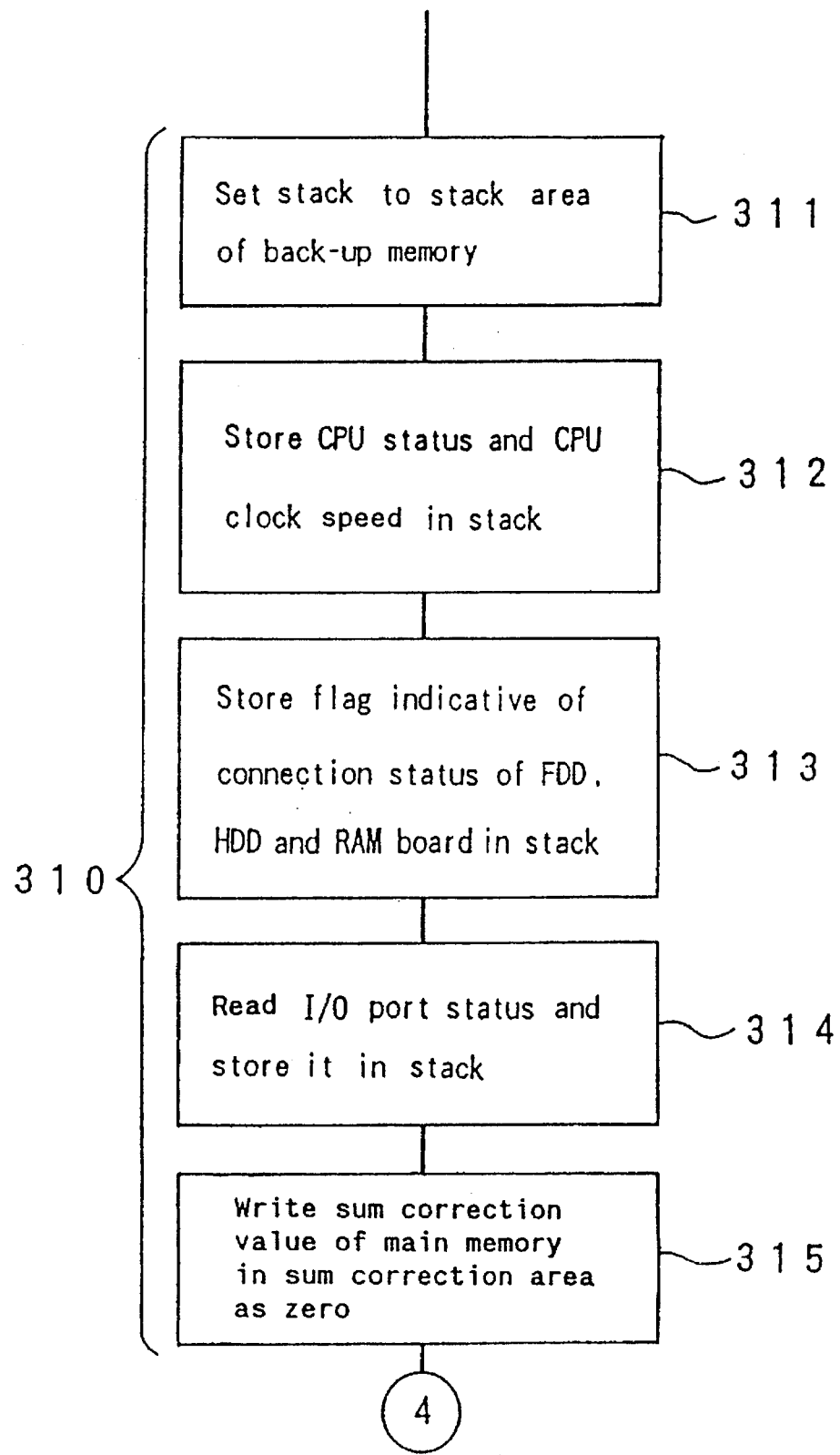
FIGS. 4A and 4B show flow charts of the data back-up/ restore system of the embodiment of FIGS. 1A–1C.
Figure 4B:
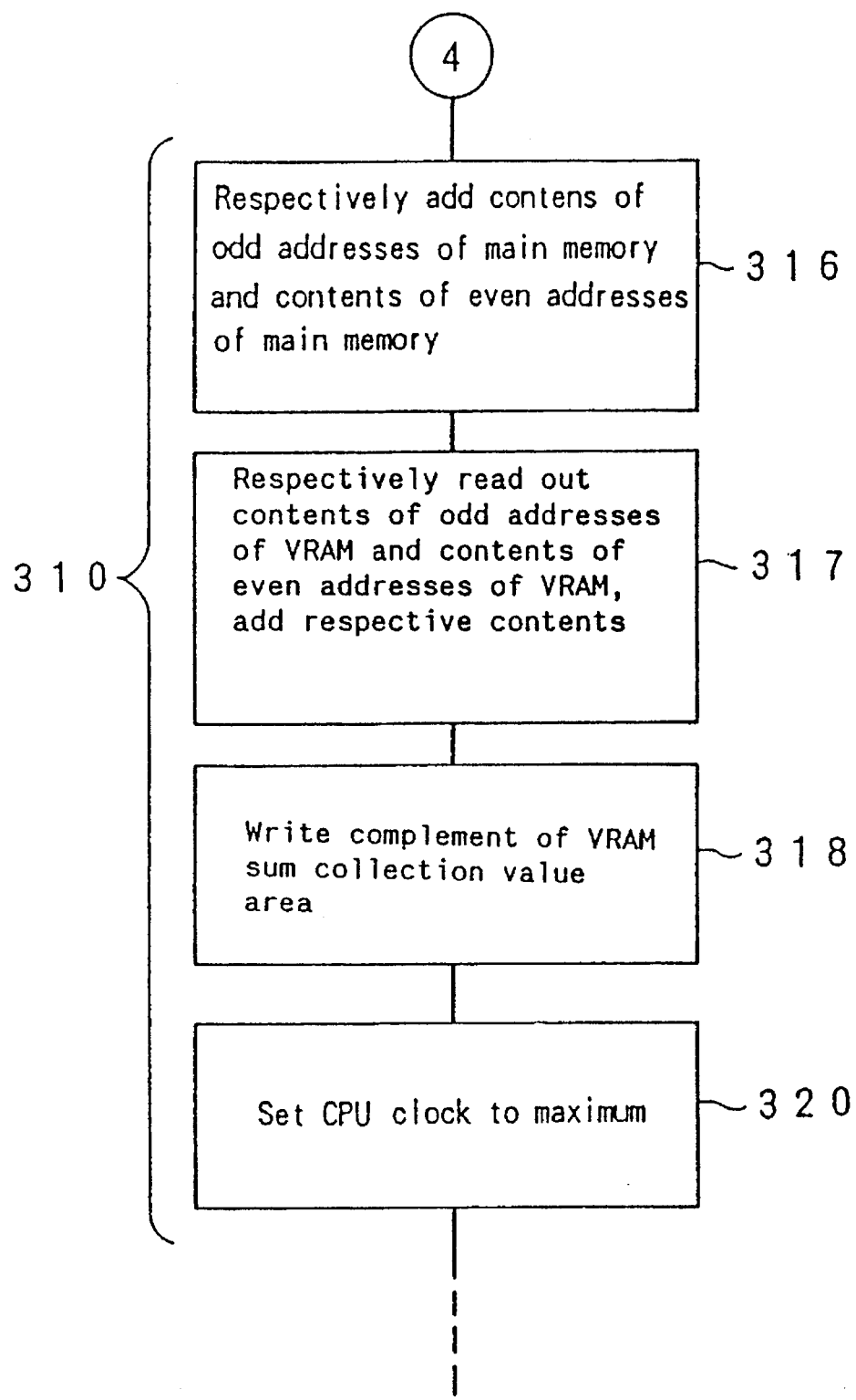

The back-up of the system environmental status configuration information which is the feature of the present embodiment is now explained with reference to FIGS. 4A and 4B which show a flow chart of the step 310 of FIG. 3B. A stack is set in the stack area 52 of the back-up memory 50 (step 311). The present clock speed of the CPU 10 and the status information of the CPU clock are stored in the stack area 52 (step 312). Flags which indicate the connection status of the devices including the floppy disk drive 71, the hard disk drive 73 and the RAMboard are read from the system management table 33 of the main memory 30 and they are stored in the stack area 52 (step 313). Those flags have been set in the system management table 33 at the time of previous power-on of the system power. Similarly, the status information of the I/O port is read and stored in the stack area 52 (step 314). The memory sum correction value area 51 of the back-up memory 50 is initialized to "0" (step 315). The sum of the contents of the main memory 30 and the VRAM 40 produced by the check sum, which is one error detection method, is stored in the stack area 52 (steps 316 and 317). Specifically, the contents of address 0 and even addresses of the memory are sequentially added. Similarly, the contents of address 1 and the other odd addresses are sequentially added. The lowest order byte of each of the sums is stored in the stack area 52. A complement of the sum is stored in the memory sum correction value area 51 (step 318). The reason for using the complement of the sum is for the comparisons of the system environment comparison information at the next power-on of the system power.

The back-up operation of the system environmental status configuration to the back-up memory 50 is summarized in FIG. 6. Complements of the sums of the odd addresses and the even addresses are backed up in the memory sum correction value area 51. The flag indicative of the connection status of the auxiliary memory 70 backed up in the system management table 33 and the status information of the I/O port are backed up in the stack area 52. The image data stored in the VRAM 40 is backed up in the back-up memory 50.

Figure 5A:
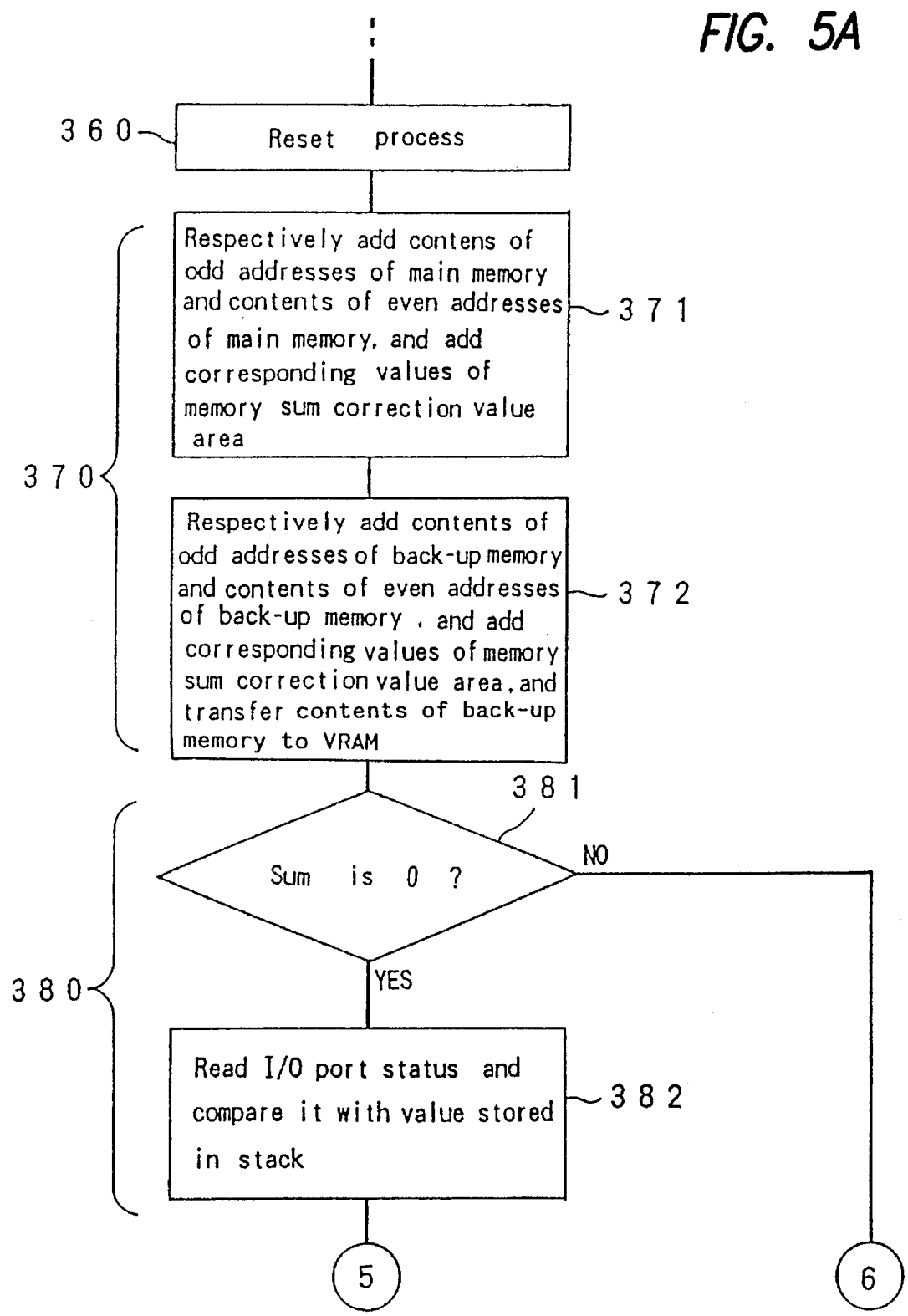
FIG. 5A and 5B show flow charts of the data back-up/ restore system of the embodiment of FIGS. 1A–1C.
Figure 5B:
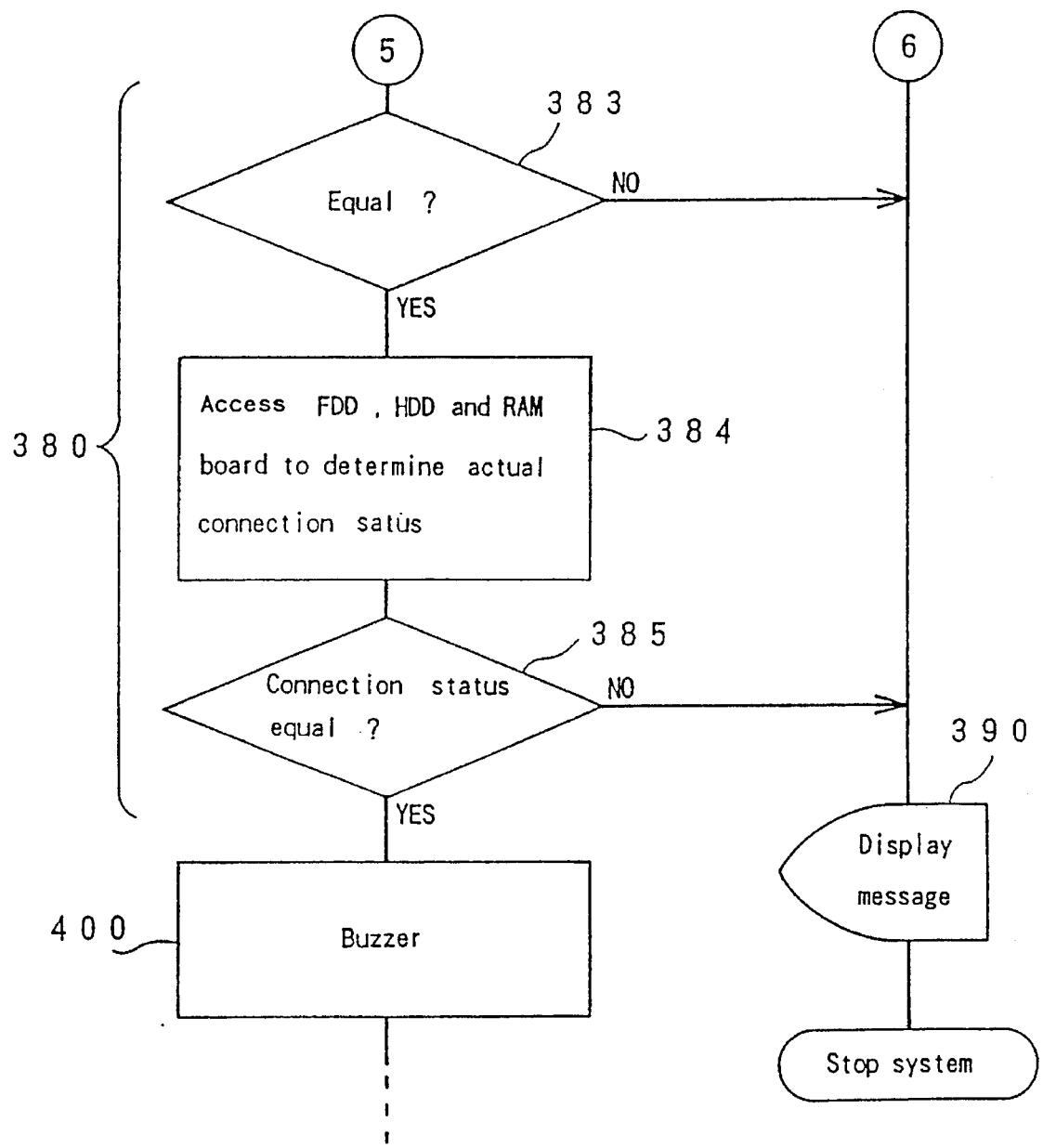

The restoring process of the system environmental status configuration which is executed after the power-on of the system power is explained with reference to FIGS. 5A and 5B which show a more detailed flow chart of the steps 370 and 380. The sum of the contents of odd addresses in the main memory 30 and the sum of the contents of the even addresses in the main memory 30 are calculated. The lowest order byte of each of the sums is read. The complement data stored in the memory sum correction value area 51 of the back-up memory 50 is read and the complement data is added to the sum (step 371).

If the content of the main memory 30 has not been destroyed from the system power-off to the next system power-on, the sum calculated in the step 316 at the time of system power-off and the sum in the step 371 are equal. Accordingly, if the content of the main memory 30 is correct, the addition of the complement data in the step 316 and the sum in the step 371 produces a sum "0". Similar calculation is made for the image data of the VRAM 40 backed up in the back-up memory 50 (step 372) to determine whether the sum is "0" or not (step 381). Then, the status information of the I/O port is read and it is compared with the status information of the I/O port at the time of system power-off which is stored in the stack area 52 (steps 382 and 383). The devices such as the floppy disk drive 71, the hard disk drive 73 and the RAM board are actually operated to check the connection status (step 384). The result of the check is compared with the data relating to flag indicative of the connection status of the devices which is stored in the stack area 52 (step 385).

If the comparison with the system environmental status configuration in the steps 381 to 385 indicates that the system environment is the same as at the time of power-off, the buzzer is activated to inform to the user that the system can be used (step 400). If they are not equal in the comparison, a message is displayed (step 390) and the system is stopped. The user is permitted to use the personal computer without using the resume function by depressing the reset key.

In the data back-up/restore system of the information processing apparatus of the present invention, the system environmental status configuration at the system power-off and the system environmental status configuration at the subsequent system power-on are computed to determine any change in the system status from the system power-off to the subsequent system power-on. By such determination, the user can exactly grasp the system status and can continuously use the information processing apparatus only when the system status has not changed.

According to one feature of the present invention, the back-up memory clock speed is increased, along with the CPU clock speed, during the back-up operations in order to shorten the back-up time. In addition, the CPU clock is turned off and the back-up memory clock speed is reduced upon completion of the power-off sequence, i.e. when the apparatus enters a standby state, in order to minimize power consumption. At this time, the back-up memory clock speed is preferably set to the lowest value which will assure reliable refreshing of the back-up memory. From the time that power is subsequently switched on, and through the reset process, including status configuration checking and restoring contents from the back-up memory clock rates are set to a high value, higher than their normal operating clock rates, the CPU clock rate preferably being set to its maximum value. Exemplary clock rates are set forth in the following TABLE, reference being made to corresponding steps in FIG. 2.

TABLE

| Computer status memory | CPU Clock | Back-up clock |
| --- | --- | --- |
| (1) normal state (corresponding to step 100) | 8 Mhz | 2–3 Mhz |
| (2) back-up of data for standby operation (corresponding to steps 111–112) | 16 Mhz | 5–6 Mhz |
| (3) standby (power off) status (corresponding to step 113) | 0 Mhz | 8–10 Mhz |
| (4) recovering from the standby status (corresponding to steps 114–118) | 16 Mhz | 5–6 Mhz |
| (5) normal state (corresponding to step 120) | 8 MHz | 2–3 MHz |

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A method of backing-up and restoring data in an information processing apparatus having a memory means, a switch means switchable between a power-on position and a power-off position and control means for controlling said memory means, said memory means having a normal operating clock rate during operation, said method comprising:

(a) in response to switching of the switch means from the power-on position to the power off position,
(a1) backing-up data stored in said memory means,
(a2) after step (a1), operating said memory means at a standby clock rate which is lower than the normal operating clock rate; and (b) in response to switching of the switch means from the power-off position to the power-on position,
(b1) checking status configuration data of said memory means by a check sum operation while operating said memory means at a clock rate higher than its normal operating clock rate:
(b2) after the step (b1), reporting to an operator of the apparatus, an indication of the completion of checking status configuration data of said memory means by a check sum operation in accordance with the step (b1); and
(b3) after the step (b2), operating said memory means at its normal operating clock rate.

2. A method of backing-up/restoring data in an information processing apparatus having a first memory for storing first data, a second memory for storing second data, a back-up memory for backing up a status of said first data and a status of said second data, and control means for controlling said first memory, said second memory and said back-up memory through a bus line, said method comprising the steps of:

(a) making a power-off status configuration data in said second data in accordance with a predetermined logical operation at the time of power-off;

(b) backing up said power-off status configuration data and said first data at the time of power-off in said back-up memory;
(b-1) changing a refresh signal of said back-up memory to a frequency for keeping a data of said back-up memory;

(c) making a power-on status configuration data in said second data in accordance with the predetermined logical operation at the time of power-on; and (d) comparing said power-off status configuration data with said power-on status configuration data to directly determine, at the maximum clock signal frequency of said apparatus, whether the second data has changed, (e) reporting to an operator of the apparatus an indication of the completion of the restoration which takes place of the data when the second data is not changed in view of the comparison resulting from step (d), and the apparatus becomes operable after the completion of step (c), and (f) changing a frequency of said clock signal to a frequency of an operational condition when the second data is not changed in view of the comparison resulting from step (d).

3. A method according to claim 2, further comprising the steps of restoring said first data backed-up in said back-up memory.

4. A method according to claim 2, further comprising the steps of permitting the use of said apparatus by a user when said power-on status configuration data is identical to said power-off status configuration data.

5. A method according to claim 2, further comprising the step of backing up an I/O port status information.

6. A method according to claim 2, further comprising the step of indicating the consequence of said step of comparing.

7. A method according to claim 2, further comprising the step of changing a clock speed of said control means at the time of power-off.

8. A method according to claim 2, wherein said predetermined logical operation includes a check sum operation.

9. A method according to claim 2, wherein said predetermined logical operation includes a check sum operation for comparing the system environmental status configuration at the system power-off with the system environmental status configuration at the system power-on.

10. A method according to claim 2, wherein said first data includes display data in a VRAM used for a display.

11. A method according to claim 2, wherein said second data includes data in a main memory used for a CPU operation.

12. An information processing apparatus comprising:
(a) detection means for detecting an interruption issued in said apparatus, during execution of an application program;
(b) back-up means in which a content of a memory of said apparatus is stored in response to an operation of said detection means;
(c) power stopping means for stopping power supply to said apparatus after the content in the memory has been backed-up by said back-up means;
   (c-1) means for changing a refresh signal of said back-up memory to a frequency for keeping a data of said back-up memory;
(d) power re-supply means for supplying power to said apparatus;
(e) reset processing means for initializing the system of said apparatus in response to the operation of said power re-supply means;
   (e-1) means for changing a frequency of said clock signal to the maximum of clock signal frequency of said apparatus;
(f) said back-up means for backing up a power-off status configuration data and a first data at the time of power off, said power-off status configuration data differing from a second data;
(g) control means for controlling said first memory, a second memory and a back-up memory through a bus line, said control means making said a power-off status configuration data in said second data in accordance with a predetermined logical operation at the time of power-off, making a power-on status configuration data in said second data in accordance with the predetermined logical operation at the time of power-on and comparing said power-off status configuration data with said power-on status configuration data,
   (g-1) means for changing a frequency of said clock signal to a frequency of an operational condition;
(h) means for returning back a status of the CPU to the status that existed before the detection of the interruption; and
(i) informing means for reporting to an operator of said apparatus an indication of the completion of the above-status recovering processing, and that said apparatus is operable, after the power is turned on and said CPU restart the processing from the reset status.

13. An apparatus according to claim 12, wherein said first memory includes a VRAM used for a display.

14. An apparatus according to claim 12, wherein said second memory includes a main memory used for a CPU operation.

15. An apparatus according to claim 12, further comprising clock speed changing means for changing a clock speed of said control means at the time of power-off.

16. An apparatus according to claim 12, further comprising information means for indicating the consequence of the comparing.

17. An apparatus according to claim 12, further comprising information means for indicating the consequence of a normal conclusion in all of the resuming process.

18. A portable type personal computer adapted to be backed-up with a battery, said computer comprising:
(a) detection means for detecting an interruption issued in said computer, during execution of an application program;
(b) means for increasing a processing speed of an operating system of said computer by changing a frequency of a clock signal of said computer in response to said detection of said interruption;
(c) back-up means in which a content in a memory of said computer is stored in response to an operation of said detection means;
(d) power stopping means for turning off power to a display, said memory and CPU which are provided in said computer, after the content in the memory has been backed-up by said back-up means;
(e) power re-supply means for supplying power to said computer;
(f) reset processing means for initializing the system of said computer in response to the operation of said power re-supply means;
(g) comparing means for returning an operation status of said memory to an operation status thereof before the receipt of the interrupt and comparing with current status thereof, connection status between said computer to an auxiliary memory unit, and I/O port status before detection of the interruption;
   (g-1) means for changing a frequency of said clock signal to the frequency that existed before the detection of the interruption;
(h) means for returning back a status of the CPU to the status that existed before the detection of the interruption;
(i) means for re-executing the application program in response to the completion of the returning-back operation in said returning back means; and
(j) informing means for reporting to an operator of said apparatus an indication of the completion of the above-status recovering the processing, and that said apparatus is operable, after the power is turned on and said CPU re-start the processing from the reset status.

19. A portable personal computer having a memory, a display, a CPU, an auxiliary memory, an I/O port, and a clock signal which determines the processing speed of an operating system executed by the computer, the computer adapted to be coupled to an external power source and having an alternate internal power source, the computer comprising:
(a) detection means for detecting, during execution of an application program, a power off interruption signal generated by the computer;
(b) means for increasing the processing speed of the operation system by changing the frequency of the clock signal in response to detection of the power off interruption signal;
(c) back-up means for storing the contents of the memory in response to detection of the power off interruption signal;
(d) switch means for disconnecting power from the display, the memory, and the CPU after the contents of the memory have been backed-up by the back-up means and for reconnecting power to the display, the memory, and the CPU;
(e) means for generating an operation status of the memory, the auxiliary memory unit, and the I/O port before receiving a power off interruption signal;
(f) means for generating an operation status of the memory, the auxiliary memory unit, and the I/O port after power has been reconnected;
(g) comparing means for comparing the operation status of the memory, the auxiliary memory unit, and the I/O port that was generated before the power off interruption signal was detected with the operation status of the memory, the auxiliary memory unit, and the I/O port generated after reconnection of the power;

(g-1) means for changing the frequency of the clock signal to the frequency that existed before the detection of the interruption;

(h) means for returning the status of the CPU to the status and said clock signal that existed before the detection of the interruption;

(i) means for continuing execution of the application program at the point at which the execution was interrupted in response to the return of status of the CPU; and (j) informing means for reporting to an operator of said apparatus an indication of the completion of the above-status recovering processing, and that said apparatus is operable, after the power is turned on and said CPU re-start the processing from the reset status.

* * * * *

UNITED STATES PATENT AND TRADEMARK OFFICE
CERTIFICATE OF CORRECTION

PATENT NO. : 5,617,532
DATED : April 1, 1997
INVENTOR(S) : Yuichi Ushiyama

It is certified that error appears in the above-indentified patent and that said Letters Patent is hereby corrected as shown below:

Column 8, lines 36-37, (e) under claim 2, delete "of the completion of the restoration which takes place of the data", and insert therefor --of the completion of the restoration of the data which takes place--.

Signed and Sealed this

Twenty-sixth Day of August, 1997

Attest:

BRUCE LEHMAN

Attesting Officer

Commissioner of Patents and Trademarks